United States Patent
Xu et al.

(10) Patent No.: US 10,774,987 B2
(45) Date of Patent: Sep. 15, 2020

(54) VIDEO GLASSES HEADBAND AND VIDEO GLASSES HEADSET

(71) Applicant: SZ DJI TECHNOLOGY CO., LTD., Shenzhen (CN)

(72) Inventors: Zhenhua Xu, Shenzhen (CN); Shaojun Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/541,952

(22) Filed: Aug. 15, 2019

(65) Prior Publication Data

US 2019/0368656 A1 Dec. 5, 2019

Related U.S. Application Data

(63) Continuation of application No. PCT/CN2017/077742, filed on Mar. 22, 2017.

(30) Foreign Application Priority Data

Feb. 24, 2017 (CN) .................... 2017 2 0177851 U

(51) Int. Cl.
G06F 1/16 (2006.01)
F16M 13/04 (2006.01)
G06F 3/01 (2006.01)
H01Q 1/27 (2006.01)

(52) U.S. Cl.
CPC ............ *F16M 13/04* (2013.01); *G06F 1/163* (2013.01); *G06F 1/1635* (2013.01); *G06F 3/011* (2013.01); *H01Q 1/273* (2013.01)

(58) Field of Classification Search
CPC ...... G06F 1/163; G06F 1/1632; G06F 1/1635; G02B 27/017; G02B 27/0176

USPC ....................................... 361/679.03, 679.41
See application file for complete search history.

(56) References Cited

U.S. PATENT DOCUMENTS

| | | | | |
|---|---|---|---|---|
| 5,321,416 A * | 6/1994 | Bassett | .................. | A42B 3/145 345/8 |
| 5,491,651 A * | 2/1996 | Janik | ...................... | G06F 1/163 361/679.03 |
| 5,815,126 A * | 9/1998 | Fan | ...................... | G02B 27/017 345/7 |
| 6,515,853 B2 * | 2/2003 | Saito | ...................... | G06F 1/163 349/58 |

(Continued)

FOREIGN PATENT DOCUMENTS

CN 205281408 U 6/2016
CN 205433661 U 8/2016

(Continued)

OTHER PUBLICATIONS

The World Intellectual Property Organization (WIPO) International Search Report for PCT/CN2017/077742 dated Sep. 11, 2017 6 Pages.

*Primary Examiner* — Anthony Q Edwards
(74) *Attorney, Agent, or Firm* — Anova Law Group, PLLC

(57) ABSTRACT

A video glasses headband includes a first head-ring-body, a second head-ring-body connected to the first head-ring-body, a docking assembly arranged at the first head-ring-body and configured to cooperate with video glasses, and a battery assembly arranged inside the second head-ring-body and including a battery.

20 Claims, 6 Drawing Sheets

(56) References Cited

U.S. PATENT DOCUMENTS

| | | | |
|---|---|---|---|
| 8,994,610 B2* | 3/2015 | Tricoukes | H04R 1/105 |
| | | | 345/8 |
| 9,703,103 B2* | 7/2017 | Araki | G09G 5/00 |
| 10,251,292 B2* | 4/2019 | Araki | G02B 27/0176 |
| 10,359,806 B2* | 7/2019 | Osman | A63F 13/25 |
| 10,502,363 B2* | 12/2019 | Edwards | G02B 27/017 |
| 10,539,787 B2* | 1/2020 | Haddick | G06F 3/0304 |
| 2007/0018908 A1* | 1/2007 | Nakabayashi | G02B 27/0176 |
| | | | 345/8 |
| 2012/0065937 A1* | 3/2012 | de Graff | G01D 9/005 |
| | | | 702/187 |
| 2012/0280007 A1* | 11/2012 | Nakabayashi | G02B 27/0176 |
| | | | 224/181 |
| 2014/0152550 A1 | 6/2014 | Beall et al. | |
| 2014/0240932 A1* | 8/2014 | Hsu | H05K 1/036 |
| | | | 361/749 |
| 2015/0253574 A1 | 9/2015 | Thurber | |
| 2016/0062125 A1* | 3/2016 | Baek | G06F 1/163 |
| | | | 361/679.01 |
| 2016/0349839 A1* | 12/2016 | Ohba | G06F 3/012 |
| 2016/0357261 A1* | 12/2016 | Bristol | A63F 13/24 |
| 2017/0337737 A1* | 11/2017 | Edwards | F16M 13/04 |
| 2018/0059715 A1* | 3/2018 | Chen | G06F 1/163 |
| 2018/0164849 A1* | 6/2018 | Chan | G06F 1/163 |
| 2019/0196536 A1* | 6/2019 | Wang | G06F 1/163 |
| 2019/0220056 A1* | 7/2019 | Yan | G06F 1/163 |
| 2019/0302836 A1* | 10/2019 | Xu | G06F 1/163 |
| 2019/0346682 A1* | 11/2019 | Kang | G02B 27/0176 |

FOREIGN PATENT DOCUMENTS

| | | |
|---|---|---|
| CN | 205581416 U | 9/2016 |
| CN | 205844637 U | 12/2016 |

* cited by examiner

VIDEO GLASSES HEADBAND AND VIDEO GLASSES HEADSET

CROSS-REFERENCE TO RELATED APPLICATION

This application is a continuation of International Application No. PCT/CN2017/077742, filed on Mar. 22, 2017, which claims priority to Chinese Application No. 201720177851.2, filed on Feb. 24, 2017, the entire content of both of which are incorporated herein by reference.

TECHNICAL FIELD

The present disclosure relates to wearable technology and, more particularly, to a video glasses headband and a video glasses headset.

BACKGROUND

With the development of Virtual Reality (VR) technologies, products, for example, VR video glasses, have emerged in the market. The applications of the VR video glasses are becoming more and more widespread. However, the video glasses generally have a large size and a heavier weight than ordinary glasses, and thus cannot be worn on a user's head via a conventional spectacle frame.

Various headbands for video glasses (e.g., VR video glasses) currently available in the market are generally divided into soft headband and hard headband according to a manner that the headbands are worn. One of the mostly common manners that the soft headband is worn uses an elastic band having a Velcro. The soft headband is made of soft material, and thus causes the headbands to be fitted better. However, the soft headband needs to be tightly attached to the head when being worn, such that the user has an uncomfortable experience after wearing a long time. Furthermore, the soft headband is easy to fall off. The hard headband provides more interior space to add more features. For example, an antenna is arranged inside the headband and communicationally coupled to the video glasses, a battery and a charging board are arranged inside the headband to allow the headband to be charged independently, or the like. However, components are generally arranged inside the video glasses of a video glasses headset, such that a space requirement of the video glasses is high. Moreover, a weight of the video glasses headset is concentrated on the video glasses. A center of gravity of the video glasses headset is located at front when being worn, and long-term wearing causes a great load on the user's cervical vertebra, thereby causing a very uncomfortable experience for the user.

SUMMARY

In accordance with the disclosure, there is provided a video glasses headband including a first head-ring-body, a second head-ring-body connected to the first head-ring-body, a docking assembly arranged at the first head-ring-body and configured to cooperate with video glasses, and a battery assembly arranged inside the second head-ring-body and including a battery.

Also in accordance with the disclosure, there is provided a video glasses headset including video glasses and a video glasses headband. The video glasses headband includes a first head-ring-body, a second head-ring-body connected to the first head-ring-body, a docking assembly arranged at the first head-ring-body and configured to cooperate with the video glasses, and a battery assembly arranged inside the second head-ring-body and including a battery.

DETAILED DESCRIPTION OF THE EMBODIMENTS

Example embodiments will be described with reference to the accompanying drawings hereinafter. It is intended that the embodiments disclosed herein are not to limit the scope of the disclosure. Variations of structures, methods, or functions of the disclosed embodiments may be made by those skilled in the art within the scope of the disclosure.

Example embodiments will be described with reference to the accompanying drawings, in which the same numbers refer to the same or similar elements unless otherwise specified.

Figure 1:
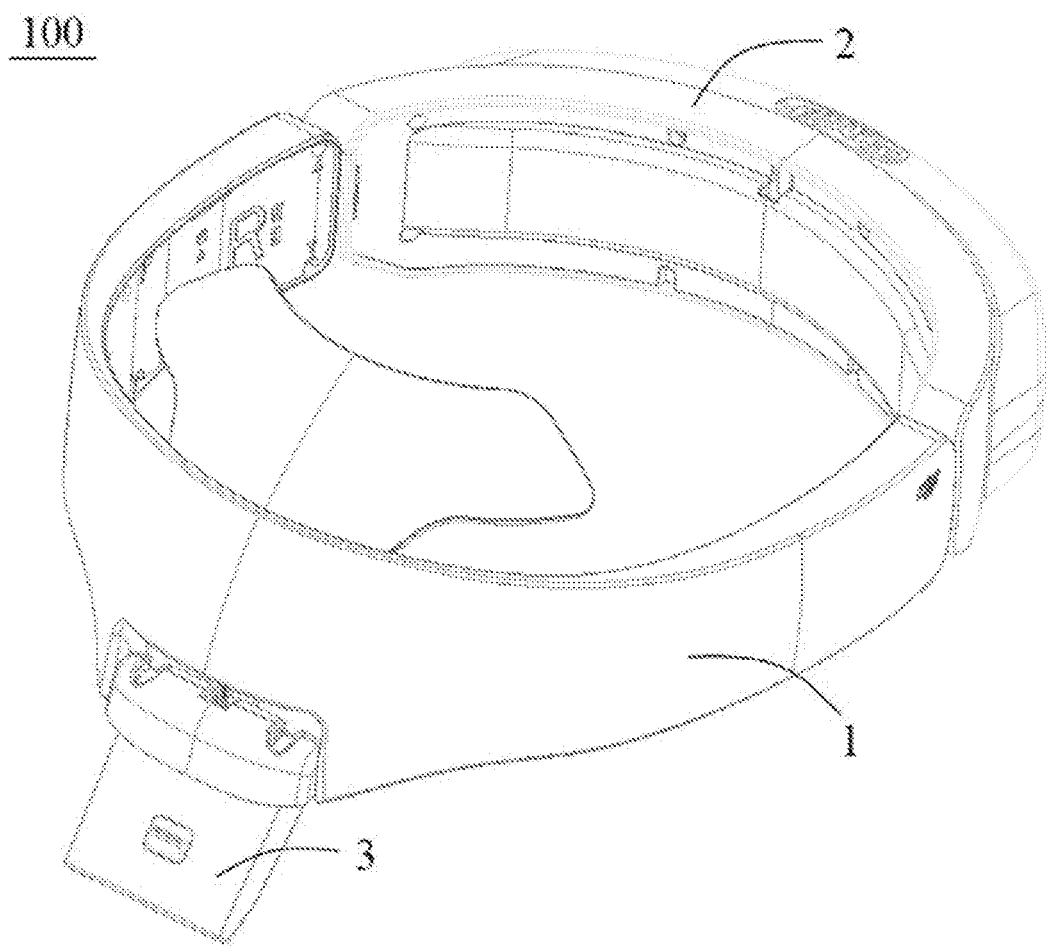
FIG. 1 is a schematic structural diagram of an example video glasses headband consistent with the disclosure.
Figure 2:
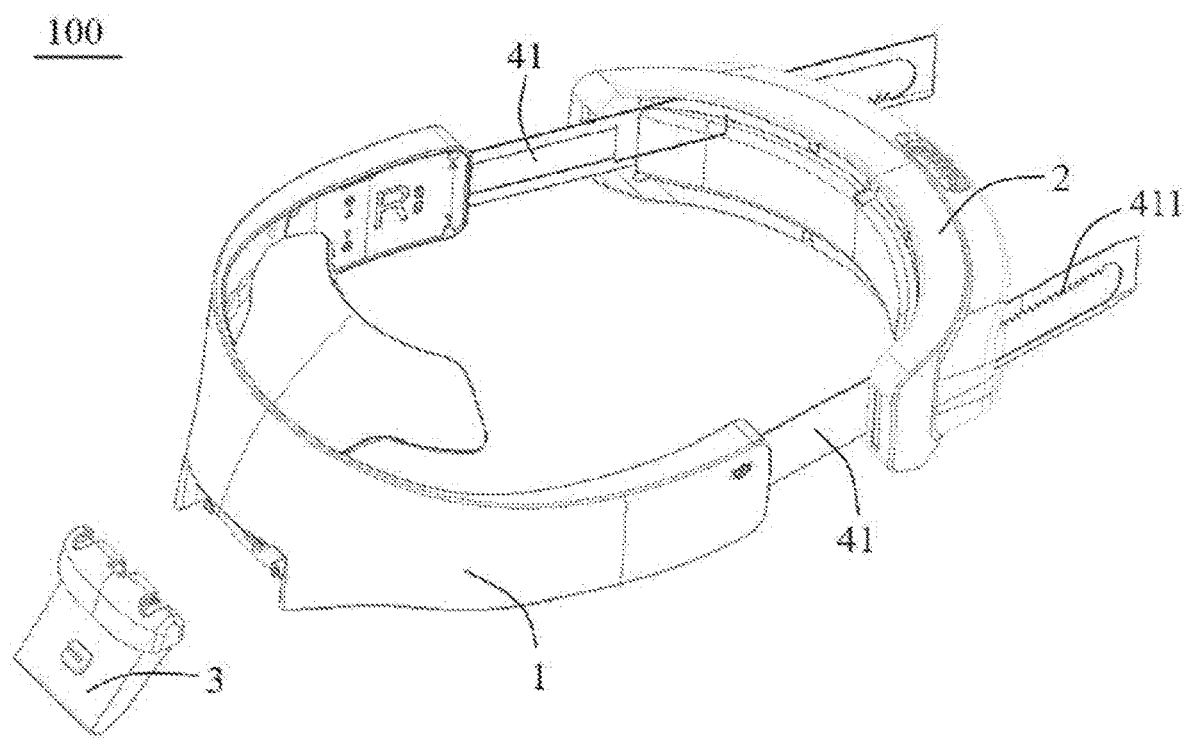
FIG. 2 is a partially exploded view of an example video glasses headband consistent with the disclosure.
Figure 3:
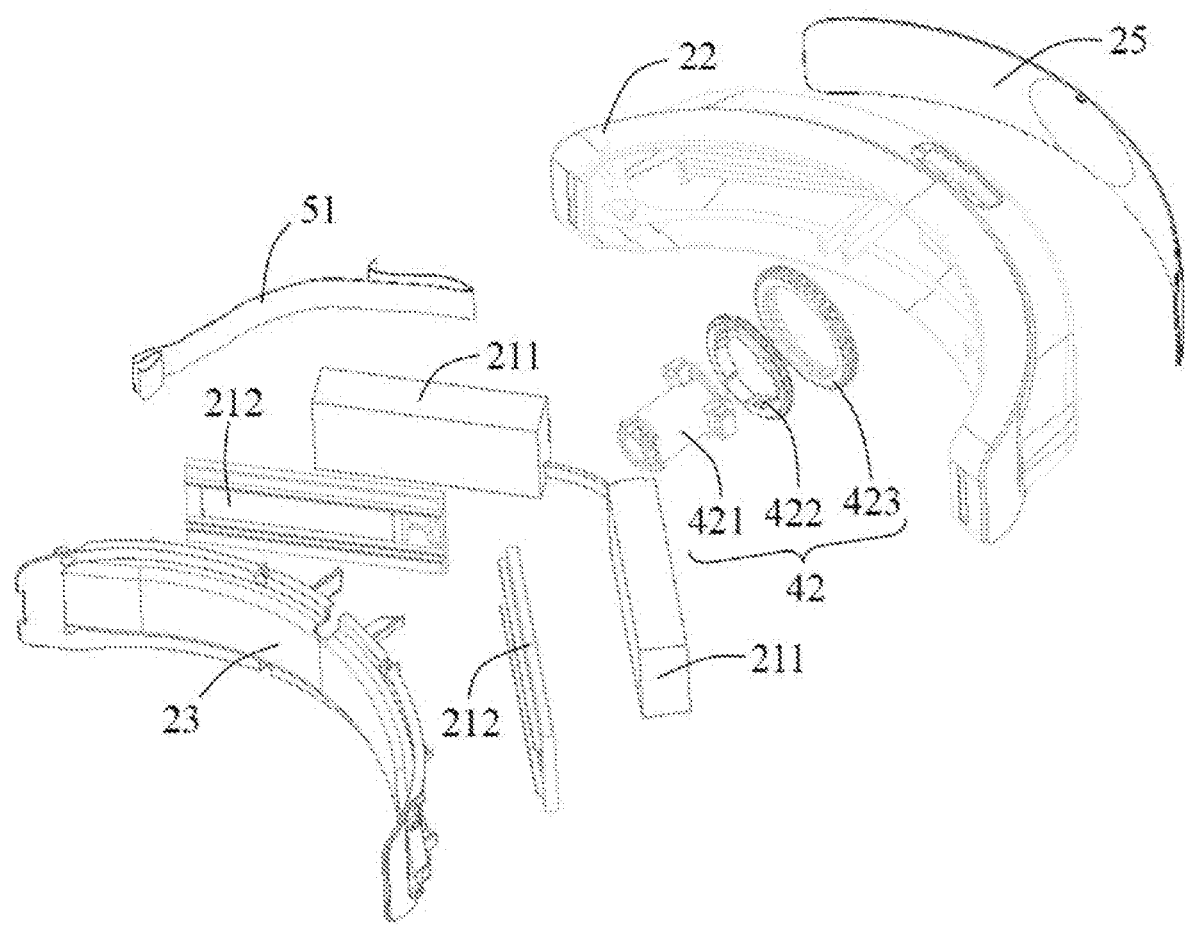
FIG. 3 is an exploded view of an example second head-ring-body consistent with the disclosure.
Figure 4:
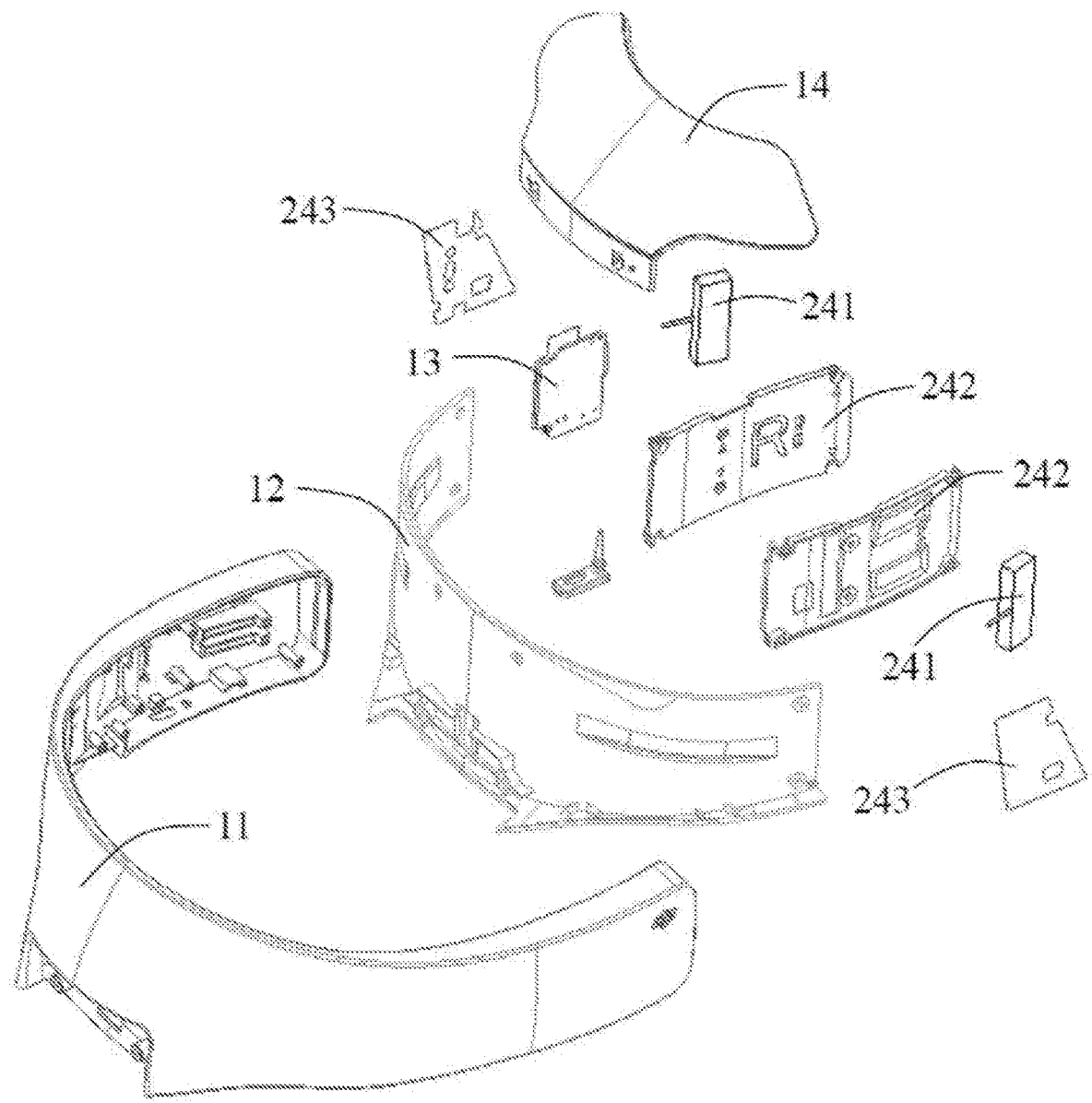
FIG. 4 is an exploded view of an example first head-ring-body consistent with the disclosure.
Figure 5:
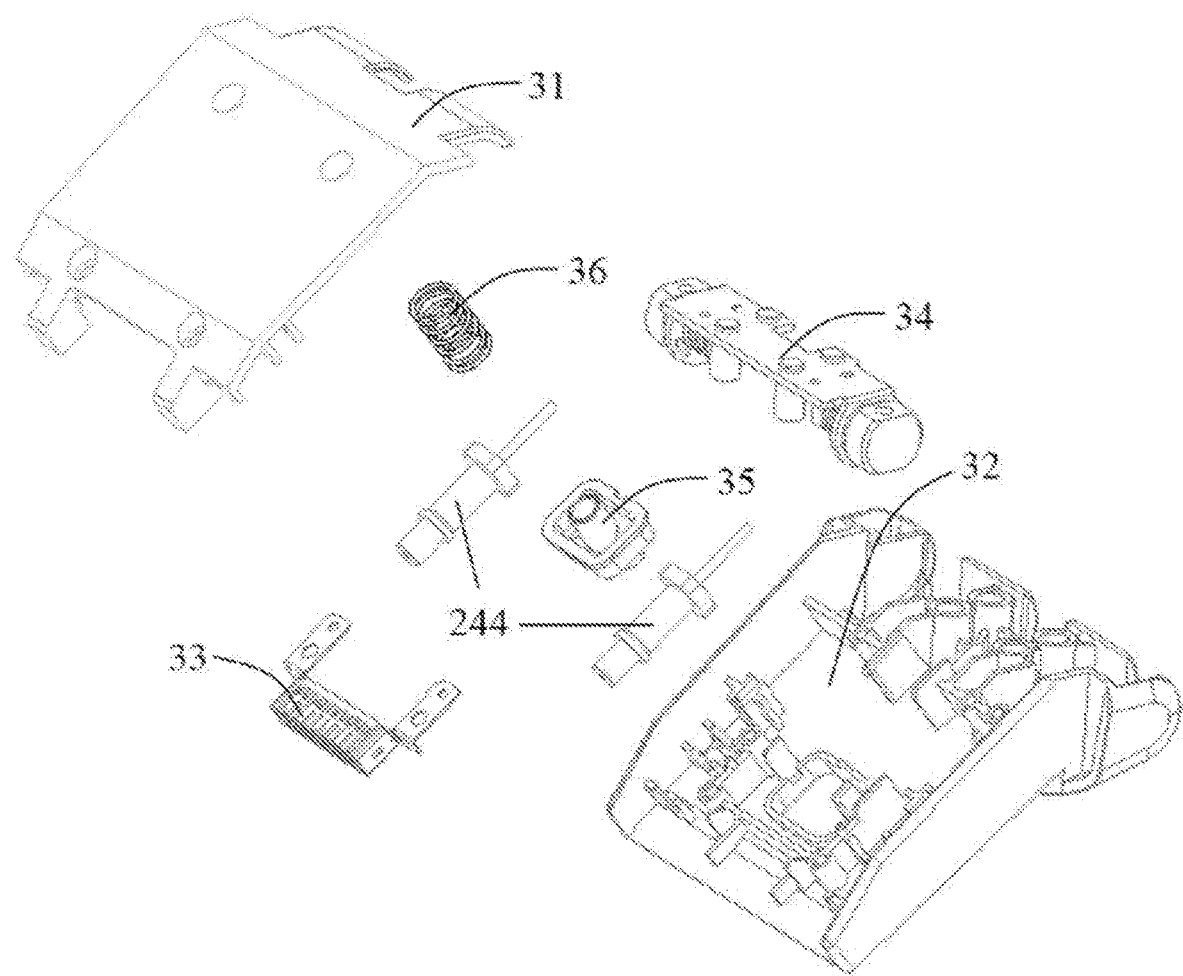
FIG. 5 is an exploded view of an example docking assembly consistent with the disclosure.
Figure 6:
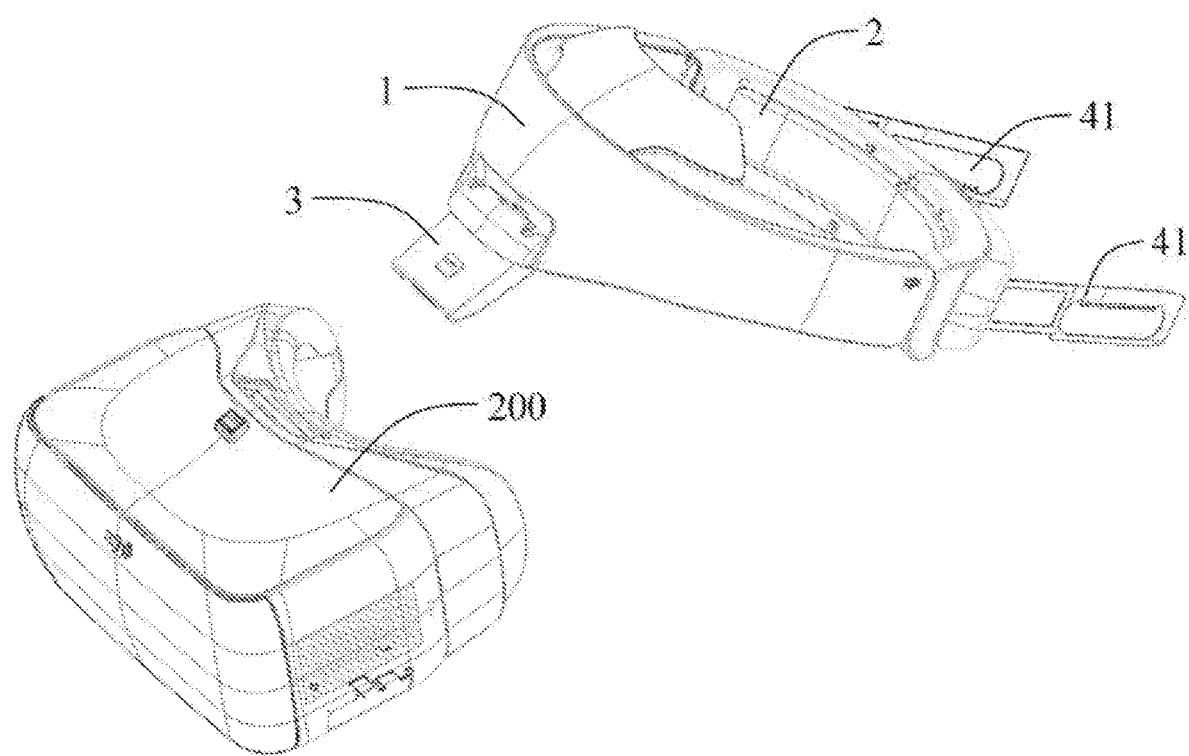
FIG. 6 is schematic structural diagram of an example video glasses headset consistent with the disclosure.

FIG. 1 is a schematic structural diagram of an example video glasses headband 100 consistent with the disclosure. FIG. 2 is a partially exploded view of the video glasses headband 100. FIG. 3 is an exploded view of an example second head-ring-body 2 consistent with the disclosure. FIG. 4 is an exploded view of an example first head-ring-body 1 consistent with the disclosure. FIG. 5 is an exploded view of an example docking assembly 3 consistent with the disclosure. FIG. 6 is s schematic structural diagram of an example video glasses headset consistent with the disclosure.

As shown in FIGS. 1 to 6, the video glasses headband 100 includes the first head-ring-body 1 and the second head-ring-body 2 connected to the first head-ring-body 1. A wearing space is formed between the first head-ring-body 1 and the second head-ring-body 2. The docking assembly 3 is arranged at the first head-ring-body 1 and configured to cooperate with video glasses 200 (also referred to as a "video glasses body"). The first head-ring-body 1 refers to a front portion of the video glasses headband 100, and the second head-ring-body 2 refers to a rear portion of the video glasses headband 100. For example, the first head-ring-body 1 can be a portion directly connected to the video glasses 200. When being worn by a user, the first head-ring-body 1 can be at both sides of the user's head, and the second head-ring-body 2 can be at a rear side of the user's head.

As shown in FIG. 3, a battery assembly is arranged inside the second head-ring-body 2, and the battery assembly includes a battery 211. With the battery assembly being arranged inside the second head-ring-body 2, not only the video glasses headband 100 can supply power to the video glasses 200, but also a weight distribution of the video glasses headset can be more uniform. Therefore, a weight balance of the video glasses headset can be improved, a wearing experience of the user can be enhanced, and a problem that the weight of the video glasses headset tilts forward to cause a large load on the cervical vertebra of the user can be avoided.

As shown in FIG. 2, the video glasses headband 100 further includes a telescoping assembly. The first head-ring-body 1 and the second head-ring-body 2 can be connected to each other via the telescoping assembly. As such, a size of the wearing space can be adjusted to fit the user's head in all sizes through adjusting the telescoping assembly.

In some embodiments, the telescoping assembly includes a telescoping band 41. An end of the telescoping band 41 is connected to a free end of the first head-ring-body 1 and the telescoping band 41 is connected to the second head-ring-body 2 at a position between two ends of the telescoping band 41. Therefore, the size of the wearing space of the video glasses headband 100 can be adjusted by a cooperation between the telescoping band 41 and the second head-ring-body 2 at different positions of the telescoping band 41. In some other embodiments, one end of the telescoping band 41 can be connected to the second head-ring-body 2 and the telescoping band 41 can be connected to the first head-ring-body 1 at a position between two ends of the telescoping band 41. Therefore, the size of the wearing space of the video glasses headband 100 can be adjusted by a cooperation between the telescoping band 41 and the first head-ring-body 1 at different positions of the telescoping band 41. In some embodiments, the telescoping assembly is not limited to the telescoping band 41, and may include an elastic band, a buckle adjustment, or the like.

As shown in FIGS. 2 and 3, the telescoping assembly further includes an adjustment mechanism 42 cooperating with the telescoping band 41. The adjustment mechanism 42 can be configured to cooperate with the telescoping band 41 to adjust the size of the wearing space. In some embodiments, the adjustment mechanism 42 can be arranged in the second head-ring-body 2. As shown in FIG. 3, the adjustment mechanism 42 includes a ratchet wheel 421, an inner gear 422 engaged with the ratchet wheel 421, and a gear cover 423 engaged with the inner gear 422. Correspondingly, as shown in FIG. 2, the telescoping band 41 includes a rack 411 engaged with the ratchet wheel 421. The rack 411 is arranged close to a free end of the telescoping band 41. The free end of the telescoping band 41 refers to an end of the telescoping band 41 that is not connected to the first head-ring-body 1 or the second head-ring-body 2.

In some embodiments, the telescoping assembly can include two telescoping bands 41, and the two telescoping bands 41 can be connected to two free ends of the first head-ring-body 1, respectively. The two telescoping bands 41 can both be engaged with the adjustment mechanism 42. Free ends of the two telescoping bands 41 can be arranged inside the second head-ring-body 2, thereby improving an overall appearance of the video glasses headband 100. During an adjustment process of the telescoping band(s) 41, the internal gear 422 can drive the ratchet wheel 421 to rotate through rotating the gear cover 423, such that the ratchet wheel 421 can be engaged with the rack 411 to move the telescoping band(s) 41 relative to the second head-ring-body 2.

As shown in FIG. 3, The video glasses headband 100 further includes a Flexible Printed Circuit board (FPC) cable 51 connected to the battery 211. The FPC cable 51 can be arranged at one of the telescoping bands 41. In some embodiments, the FPC cable 51 can be configured to electrically couple the first head-ring-body 1 to the second head-ring-body 2, and can further be adapted to the adjustment of the telescoping band(s) 41 and move with the telescoping band(s) 41.

As shown in FIG. 3, the second head-ring-body 2 includes a rear case 22 and a rear support member 23. A receiving space can be formed between the rear case 22 and the rear support member 23. The battery assembly can be arranged at the receiving space formed by the rear case 22 and the rear support member 23. The second head-ring-body 2 further includes a rear trim 25 arranged at the rear case 22. The rear trim 25 can further increase an aesthetic effect of the video glasses headband 100.

The battery assembly further includes a battery support member 212 (also referred to as a "battery holder") for holding the battery 211. The battery 211 can be fixed to the rear support member 23 or the rear case 22 via the battery support member 212, such that the battery 211 can be fixed at the second head-ring-body 2. In some embodiments, the video glasses headband 100 can include two sets of the battery 211 and the battery support member 212. The two sets can include a first set including a first battery 211 and a first support member 212 and a second set including a second battery 211 and a second support member 212. The two sets of the battery 211 and the battery support member 212 can be arranged inside the second head-ring-body 2, for example, the two sets can be arranged at an inner left part and an inner right part of the second head-ring-body 2, respectively, such that a relatively balanced weight distribution inside the second head-ring-body 2 can be achieved. The two batteries 211 can be electrically coupled to each other, such that the battery assembly can have a large storage capacity.

As shown in FIG. 4, the video glasses headband 100 further includes an antenna assembly. The antenna assembly at least includes an antenna 241 arranged inside the first head-ring-body 1. In conventional technologies, generally only the video glasses of the video glasses headset includes an antenna, resulting in a limited radiation direction and radiation range. Consistent with the disclosure, the antenna assembly can be additionally provided in the video glasses headband 100. As such, the antenna 241 can effectively enhance the signal transceiving performance of the video glasses headset, such that the radiation range of the video glasses headset can be wider and a remote control base on body movement can be more accurate.

The antenna assembly further includes an antenna reflection sheet 243 arranged inside the first head-ring-body 1 and configured to cooperate with the antenna 241. The antenna reflection sheet 243 can control an angle of the signal received by the antenna 241 to be obliquely behind the video glasses headband 100. That is, the antenna reflection sheet 243 can control a signal receiving angle of the antenna 241 to be obliquely behind the video glasses headband 100. As such, the signal radiation performance of the video glasses headband 100 at the two sides and a rear side of the user can be improved. The antenna assembly further includes a support shell 242 arranged in the first head-ring-body 1 for holding the antenna 241.

In some embodiments, the video glasses headband 100 can include two sets of the antenna 241, the support shell 242, and the antenna reflection sheet 243. The two sets can include a first set including a first antenna 241, a first support shell 242, and a first antenna reflection sheet 243, and a second set including a second antenna 241, a second support shell 242, and a second antenna reflection sheet 243. The two sets can be arranged at the two sides of the first head-ring-body 1. For example, the two sets can be arranged at an inner left side and an inner right side of the first head-ring-body 1 close to the free ends of the first head-ring-body 1, respectively. The radiation range of the antenna 241 can be further enhanced by the two sets of the above components. The antenna assembly further includes a radio frequency connector 244 (shown in FIG. 5) arranged inside the docking assembly 3. The radio frequency connector 244 can be connected to the antenna(s) 241. The electrical coupling between the antenna(s) 241 and a main board in the video glasses 200 can be achieved through connecting the radio frequency connector 244 to the video glasses 200.

In some embodiments, as shown in FIG. 4, the first head-ring-body 1 includes a front case 11 and a front side support case 12. An accommodating space is formed between the front case 11 and the front side support case 12, and the antenna assembly can be arranged inside the accommodating space formed by the front case 11 and the front side support case 12. The first head-ring-body 1 includes the support shell(s) 242 connected to the first head-ring-body 1. The support shell(s) 242 can be configured to abut against the user's head to prevent the video glasses headband 100 from sliding down.

In some embodiments, as shown in FIG. 5, the docking assembly 3 includes a rotating shaft assembly. The rotating shaft assembly includes a guide-groove-upper-case 31, a guide-groove-lower-case 32, and a power connector 33 electrically coupled to the battery assembly. The power connector 33 can be arranged inside an accommodating space formed by the guide-groove-upper-case 31 and the guide-groove-lower-case 32 and configured to be electrically coupled to the video glasses 200.

As shown in FIG. 4, the video glasses headband 100 further includes a charging board 13, which can be coupled between the battery assembly and the power connector 33. The charging board 13 can be arranged inside the first head-ring-body 1 to be electrically coupled to the power connector 33. The charging board 13 can be connected to the FPC cable 51 and then connected to the battery 211 via the FPC cable 51. The charging board 13 can be used as an interface for an external charging device, and a charging interface of the external charging device can be plugged on the charging board 13 to charge the video glasses headset. Consistent with the disclosure, adding the charging board 13 to the video glasses headband 100 allows the video glasses headband 100 to be independently charged.

As shown in FIG. 5, the rotating shaft assembly further includes a guide-groove-rotating-shaft 34 connected to the first head-ring-body 1. The first head-ring-body 1 and the docking assembly 3 can be rotated around the guide-groove-rotating-shaft 34. As such, the rotating shaft assembly can be rotated relative to the first head-ring-body 1. After the rotating shaft assembly is connected to the video glasses 200, a relative angle between the video glasses 200 and the first head-ring-body 1 can be adjusted, thereby providing a more comfortable viewing angle for the user.

The rotating shaft assembly further includes a pressing cover 35 and a compression spring 36. The pressing cover 35 can be elastically received in the rotating shaft assembly under the pressure of the compression spring 36, such that a quick release between the rotating shaft assembly and the video glasses 200 can be realized by pressing the pressing cover 35.

Consistent with the disclosure, the battery assembly of the video glasses headband 100 can be arranged inside the second headband body 2, such that the weight balancing of the video glasses headband 100 can be improved. Therefore, the weight distribution of the video glasses can be more balanced and the wearing experience of the user can be improved. Adding the charging board 13 to the first head-ring-body 1 allows the video glasses headband 100 to be be independently charged. Therefore, the use of the video glasses headband 100 can be more convenient. Furthermore, adding the antenna assembly to the first head-ring-body 1 allows the video glasses headband 100 to have a wider radiation range, and the remote control based on the body movement can be more accurate.

The present disclosure also provides an example video glasses headset. As shown in FIG. 6, the video glasses headset includes the video glasses 200 and the video glasses headband 100 described above. The video glasses headband 100 can be assembled to the video glasses 200 via the docking assembly 3. Consistent with the disclosure, the battery assembly of the video glasses headband 100 can be arranged inside the second headband body 2, such that the weight balancing of the video glasses headband 100 can be improved. Therefore, the weight distribution of the video glasses can be more balanced and the wearing experience of the user can be improved. The charging board 13 can be added to the first head-ring-body 1, such that the video glasses headband 100 can be independently charged. Therefore, the use of the video glasses headband 100 can be more convenient. Furthermore, the antenna assembly can be added to the first head-ring-body 1, such that the video glasses headband 100 can have a wider radiation range, and the remote control based on the body movement can be more accurate.

In some embodiments, as shown in FIGS. 1 to 6, the video glasses headband 100 includes the first head-ring-body 1 and the second head-ring-body 2 connected to the first head-ring-body 1. The wearing space is formed between the first head-ring-body 1 and the second head-ring-body 2. The docking assembly 3 is arranged at the first head-ring-body 1 and configured to cooperate with video glasses 200. In some embodiments, the video glasses headband 100 further includes the antenna assembly. The antenna assembly includes the antenna 241 arranged inside the first head-ring-body 1 or the second head-ring-body 2. Consistent with the disclosure, adding the antenna assembly in the video glasses headband 100 and arranging the antenna assembly inside the first head-ring-body 1 or the second head-ring-body 2 can result in a wider radiation range of the video glasses headband 100, and the radiation performance of the antenna 241 can be enhanced.

The antenna assembly further includes the antenna reflection sheet 243 arranged inside the first head-ring-body 1 and configured to cooperate with the antenna 241. The antenna reflection sheet 243 can control the angle of the signal received by the antenna 241 to be obliquely behind the video glasses headband 100, thereby enhancing the signal radiation performance of the video glasses headband 100 at the two sides and the rear side of the user. The antenna assembly further includes the support shell 242 arranged in the first head-ring-body 1 for holding the antenna 241.

In some embodiments, the video glasses headband 100 can include the two sets of the antenna 241, the support shell 242, and the antenna reflection sheet 243. The two sets can be arranged at the two sides of the first head-ring-body 1 or the two sides of the second head-ring-body 2. The radiation range of the antenna 241 can be further enhanced by the two sets of the above components. The antenna assembly further includes the radio frequency connector 244 arranged inside the docking assembly 3. The radio frequency connector 244 can be connected to the antenna(s) 241. The electrical coupling between the antenna(s) 241 and the main board in the video glasses 200 can be achieved through connecting the radio frequency connector 244 to the video glasses 200.

The docking assembly 3 includes the rotating shaft assembly. The rotating shaft assembly includes the guide-groove-upper-case 31, the guide-groove-lower-case 32, and the power connector 33 electrically coupled to the battery assembly. The power connector 33 can be arranged inside the accommodating space formed by the guide-groove-upper-case 31 and the guide-groove-lower-case 32 and configured to be electrically coupled to the video glasses 200.

The rotating shaft assembly further includes the guide-groove-rotating-shaft 34 connected to the first head-ring-body 1. The first head-ring-body 1 and the docking assembly 3 can be rotated around the guide-groove-rotating-shaft 34. As such, the rotating shaft assembly can be rotated relative to the first head-ring-body 1. After the rotating shaft assembly is connected to the video glasses 200, the relative angle between the video glasses 200 and the first head-ring-body 1 can be adjusted, thereby providing the more comfortable viewing angle for the user.

Consistent with the disclosure, the antenna assembly can be added to the first head-ring-body 1 or the second head-ring-body 2, such that the video glasses headband 100 can have the wider radiation range and the signal radiation performance of the video glasses headband 100 at the two sides and the rear side of the use can be enhanced.

The present disclosure also provides another example video glasses headset. The video glasses headset can include the video glasses 200 and the video glasses headband 100 described above. The antenna assembly can be added to the first head-ring-body 1 or the second head-ring-body 2 of the video glasses headband 100, such that the video glasses headband 100 can have the wider radiation range and the signal radiation performance of the video glasses headband 100 at the two sides and the rear side of the use can be enhanced.

Consistent with the disclosure, the video glasses headband and the video glasses headset can include the battery assembly arranged inside the second headband body, such that the weight balancing of the video glasses headband 100 can be improved. Therefore, the weight distribution of the video glasses can be more balanced and the wearing experience of the user can be improved. Furthermore, the charging board can be added to the first head-ring-body, such that the video glasses headband can be independently charged. Therefore, the use of the video glasses headband can be more convenient. Furthermore, the antenna assembly can be added to the first head-ring-body, such that the video glasses headband can have the wider radiation range, and the remote control based on the body movement can be more accurate.

Other embodiments of the disclosure will be apparent to those skilled in the art from consideration of the specification and practice of the embodiments disclosed herein. Any variations, uses, or adaptations of the present disclosure in accordance with the general principles of the present disclosure and including common general knowledge or conventional technical means in the art that are not disclosed in the present disclosure should fall within the scope of the present disclosure. It is intended that the specification and examples be considered as exemplary only and not to limit the scope of the disclosure, with a true scope and spirit of the invention being indicated by the following claims.

The present disclosure is not limited to the structures in the disclosed embodiments and the disclosed drawings. Changes, modifications, alterations, and variations of the above-described embodiments may be made by those skilled in the art within the scope of the disclosure. The scope of the invention is defined by the following claims.

What is claimed is:

1. A video glasses headband comprising:
    a first head-ring-body;
    a second head-ring-body connected to the first head-ring-body;
    a battery assembly arranged inside the second head-ring-body and including a battery; and
    a docking assembly comprising:
        a case;
        a rotating shaft assembly configured to pivotably couple the docking assembly with the first head-ring-body; and
        a power connector being arranged inside the case and providing an electrical connection between the battery assembly and video glasses.

2. The headband of claim 1, further comprising:
    a telescoping assembly;
    wherein the first head-ring-body and the second head-ring-body are connected to each other via the telescoping assembly.

3. The headband of claim 2,
    wherein the telescoping assembly includes a telescoping band;
    the headband further comprising:
        a Flexible Printed Circuit board (FPC) cable arranged at the telescoping band and configured to be connected to the battery.

4. The headband of claim 3, wherein the telescoping assembly further includes:
    an adjustment mechanism configured to cooperate with the telescoping band to adjust a size of a wearing space formed between the first head-ring-body and the second head-ring-body.

5. The headband of claim 1, wherein the battery assembly further includes a battery support member configured to hold the battery.

6. The headband of claim 5, wherein:
    the battery is a first battery and the battery support member is a first battery support member, the first battery and the first battery support member being arranged at an inner left part of the second head-ring-body; and
    the battery assembly further includes a second battery and a second battery support member arranged at an inner right part of the second head-ring-body.

7. The headband of claim 5, wherein:
    the second head-ring-body includes a rear case and a rear support member; and
    the battery assembly is arranged at a receiving space formed by the rear case and the rear support member.

8. The headband of claim 1, further comprising:
    an antenna assembly including an antenna arranged inside the first head-ring-body.

9. The headband of claim 8, wherein the antenna assembly further includes:
    an antenna reflection sheet arranged inside the first head-ring-body and configured to cooperate with the antenna to control a signal receiving angle of the antenna to be obliquely behind the headband.

10. The headband of claim 8, wherein:
    the first head-ring-body includes a front case and a front side support case; and
    the antenna assembly is arranged inside an accommodating space formed by the front case and the front side support case.

11. The headband of claim 8, wherein the antenna assembly further includes:
a radio frequency connector arranged inside the docking assembly and connected to the antenna.

12. The headband of claim 1, wherein:
The case includes:
a guide-groove-upper-case; and
a guide-groove-lower-case.

13. The headband of claim 12, further comprising:
a charging board coupled between the battery assembly and the power connector and arranged inside the first head-ring-body.

14. The headband of claim 12, wherein:
the rotating shaft assembly further includes a guide-groove-rotating-shaft connected to the first head-ring-body; and
the first head-ring-body and the docking assembly are configured to rotate around the guide-groove-rotating-shaft.

15. A video glasses headset comprising:
video glasses; and
a video glasses headband including:
a first head-ring-body;
a second head-ring-body connected to the first head-ring-body;
a battery assembly arranged inside the second head-ring-body and including a battery; and
a docking assembly comprising:
a case;
a rotating shaft assembly configured to pivotably couple the docking assembly with the first head-ring-body; and
a power connector being arranged inside the case and providing an electrical connection between the battery assembly and video glasses.

16. The headset of claim 15, wherein:
the headband further includes a telescoping assembly; and
the first head-ring-body and the second head-ring-body are connected to each other via the telescoping assembly.

17. The headset of claim 16, wherein:
the telescoping assembly includes a telescoping band; and
the headband further includes:
a Flexible Printed Circuit board (FPC) cable arranged at the telescoping band and configured to be connected to the battery.

18. The headset of claim 17, wherein the telescoping assembly further includes:
an adjustment mechanism configured to cooperate with the telescoping band to adjust a size of a wearing space formed between the first head-ring-body and the second head-ring-body.

19. The headset of claim 18, wherein
the adjustment mechanism includes:
a ratchet wheel;
an inner gear engaged with the ratchet wheel; and
a gear cover engaged with the inner gear; and
the telescoping band includes:
a rack engaged with the ratchet wheel.

20. The headset of claim 15, wherein the battery assembly further includes a battery support member configured to hold the battery.

* * * * *